United States Patent [19]

Sternby et al.

[11] 4,071,193

[45] Jan. 31, 1978

[54] METHOD OF AND APPARATUS FOR FLOW SPREADING

[75] Inventors: Arthur J. Sternby, Middletown; Ronald D. Cruea, Carlisle, both of Ohio

[73] Assignee: The Black Clawson Company, Middletown, Ohio

[21] Appl. No.: 706,583

[22] Filed: July 19, 1976

[51] Int. Cl.$^2$ .............................................. B05B 1/26
[52] U.S. Cl. .................................... 239/11; 239/500; 239/502; 239/523; 239/602
[58] Field of Search ............... 239/499, 518, 520, 522, 239/523, 524, 602, 521, 546, 1, 11, 500, 502; 209/264, 268, 272–274, 281, 393, 395, 12, 13; 210/456, 461, 483, 485, 498, 499, 512, 513, 473

[56] References Cited

U.S. PATENT DOCUMENTS

| 2,133,974 | 10/1938 | Cowles ................................ 209/273 |
| 2,596,653 | 5/1952 | Clague et al. ..................... 239/523 X |
| 2,959,359 | 11/1960 | Casaletto ......................... 239/546 X |
| 3,221,877 | 12/1965 | De Koning ....................... 209/395 X |
| 3,835,999 | 9/1974 | Moore .............................. 209/281 X |

Primary Examiner—Evon C. Blunk
Assistant Examiner—Andres Kashinikow
Attorney, Agent, or Firm—Biebel, French & Nauman

[57] ABSTRACT

Flow spreading method and apparatus particularly adapted for use with a generally parabolic, slotted screening or dewatering surface, which redimensions the cross-sectional shape of a flow of material from a relatively narrow width, deep depth flow to a relatively shallow depth, wide width flow approximately equal to the width of the surface to which the flow is delivered. The apparatus includes a curved plate preferably having a substantially constant radius of curvature and a conduit which directs the material against the curved plate non-tangentially with respect to its surface to induce a smooth but rapid redirection and hence, redimensioning of the flow cross-sectional configuration. The conduit feeding the material may have at least its terminal portion constructed of a flexible material which allows the conduit outlet to be pressed against the surface of the curved plate and deformed somewhat to enhance flow spreading while still permitting the passage of relatively large objects through the conduit.

10 Claims, 5 Drawing Figures

U.S. Patent
Jan. 31, 1978
4,071,193
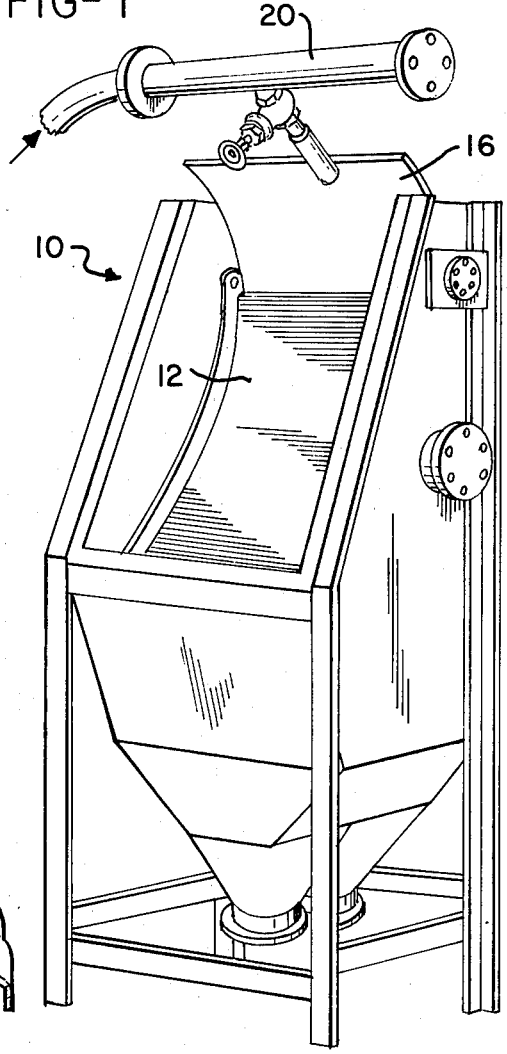
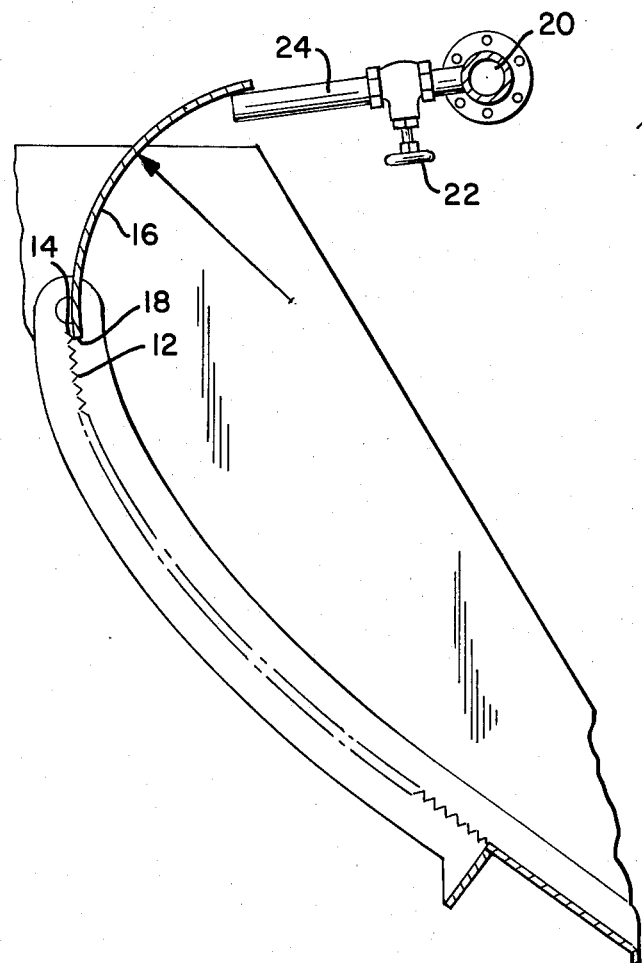
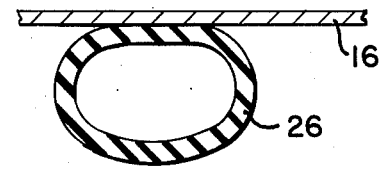
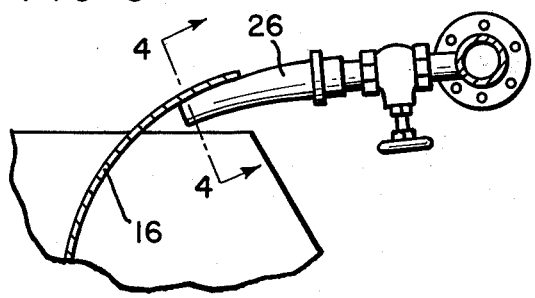
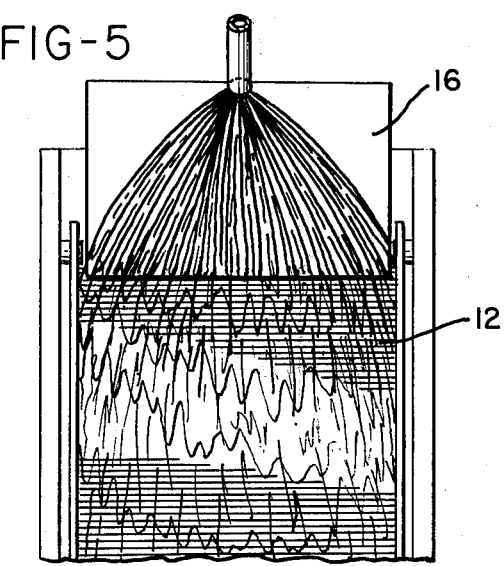

METHOD OF AND APPARATUS FOR FLOW SPREADING

BACKGROUND OF THE INVENTION

In a number of operations it is desirable to convert a flow of material from, for example, a round pipe, to a jet of essentially rectangular cross-sectional configuration. In feeding cylinder and fourdinier type paper machines, traveling belt thickneners and other traveling screens and dewatering surfaces, for example, this is generally true, and a headbox of some type having a rectangular slice opening is used for this purpose.

A similar conversion is desirable in feeding certain types of stationary screening and dewatering apparatus. Application Ser. No. 614,885, filed Sept. 19, 1975 (now abandoned) and assigned to the assignee of this application, discloses apparatus which includes an improved, generally upright dewatering surface of parabolic configuration. As disclosed in the application, material is fed to the dewatering surface from a series of nozzles positioned along the upstream end of the surface.

U.S. Pat. No. 2,996,182 also discloses a stationary screen in which material is flowed across a screen surface to separate liquids and solids. The screen is disclosed as having a circular screening surface and an extension plate onto which a series of pipes direct jets of material tangentially to allow the jets to unite prior to reaching the screen surface.

Of course where a shallow, rectangular slice opening or a plurality of small diameter pipes or nozzles are used to deliver material to a screen or dewatering surface, the danger of a blockage at the slice opening or the outlets from the pipes or nozzles is great, but has been accepted as a necessary disadvantage associated with converting the flow to the desired condition for deposit on or across a screen or dewatering surface.

SUMMARY OF THE INVENTION

The present invention provides an improved flow spreader for converting a stream of material exiting a feed conduit to a relatively wide, shallow stream for flow across a screening or dewatering surface.

In accordance with the present invention, a curved, imperforate plate, preferably having a relatively small radius of curvature is positioned adjacent the upstream end of the screening or dewatering surface and a conduit is provided to impinge the material against the curved plate adjacent its upper end.

The stream impinges directly on and intersects the surface of the curved plate in a non-tangential direction, and as it flows across the curved plate surface in undergoes an abrupt but smooth change in direction. As a result, the inertia of the material causes it to flatten from a relatively deep, narrow width flow, such as from a circular pipe, to a relatively shallow, wide width flow, so that by the time the material reaches the upper end of the screening or dewatering surface its width approximates that of the surface.

By using an imperforate plate having a relatively tight radius of curvature and feeding the material against the plate non-tangentially with respect thereto, the same flow spreading is obtained as with a plurality of small diameter pipes or with a wide shallow rectangular outlet, such as the slice of a papermaking machine. However, the danger of blockage is obviously decreased substantially when multiple pipe or slice type discharge openings are replaced with a large diameter feed conduit.

In this regard it will be noted that the discharge end of the feed conduit may be formed of a flexible material. The discharge end of the conduit, therefore, can be pressed against the surface of the curved plate, deforming it somewhat and enhancing flow spreading. However, because of the flexible character of the conduit, any large materials which might otherwise be trapped in a rigid, narrow opening, deform the flexible conduit and pass through the system and to the screen or dewatering apparatus.

From the above and following description it will be seen that the present invention provides an improved flow spreading system for converting a flow of a material to a relatively wide shallow stream suitable for passage onto or over a screen or dewatering surface.

BRIEF DESCRIPTION OF THE DRAWINGS

FIG. 1 is a perspective view showing an application of the flow spreader of the present invention;

FIG. 2 is a partial cross-sectional view through the apparatus of FIG. 1;

FIG. 3 is a view similar to FIG. 2 but showing an alternate embodiment of the invention;

FIG. 4 is a view taken on line 4—4 of FIG. 3; and

FIG. 5 is a front elevational view of the apparatus of the present invention.

DESCRIPTION OF THE PREFERRED EMBODIMENTS

As shown in FIG. 1 of the drawings, the present invention may be used in conjunction with dewatering or screening apparatus of the fixed type disclosed in the above noted, co-pending application Ser. No. 614,885, abandoned, although it will be apparent that additional use can be found in traveling screening or dewatering apparatus, such as papermaking machines and the like as well as in other fixed screens and dewatering apparatus.

The apparatus 10 of FIG. 1 is shown as including a dewatering surface 12 which consists of a plurality of closely spaced bars over which the material is flowed. Typically a suspension of papermaking fibers might be flowed across the surface 12 in a thickening operation.

Mounted adjacent an upstream edge 14 of the surface 12 is curved plate 16 terminating in a downstream edge 18 which may be coplanar with the adjacent edge of surface 12 or preferably positioned outwardly thereof as shown. As can be best seen in FIG. 2 of the drawings, the plate 16 has a relatively tight radius of curvature. In practice a substantially constant radius of curvature has been found to perform satisfactorily, although the radius of curvature of plate 16 may be non-uniform. The plate 16 can be compared to the surface 12, which is of generally parabolic shape and, as is apparent from FIG. 2, of a substantially lesser degree of curvature than the imperforate plate 16.

Shown extending across the top of the apparatus 12 is a header 20 to which is connected by suitable valving 22 a conduit 24. The end of conduit 24 is disposed in non-tangential relationship with the imperforate plate 16, as can be seen in FIG. 2 of the drawings.

As will be apparent from FIG. 4, as the relatively narrow width, deep depth flow of material exits the conduit 24, the rapid change of direction of material flow, both by virtue of its non-tangential direction of feed to the plate 16 and the relatively tight radius of curvature of the plate 16, causes the cross-sectional configuration of the flow to change to a relatively wide, shallow flow of approximately the same width as the width of the upstream end of the surface 12.

As a result the necessity of utilizing a plurality of relatively small diameter feed pipes, as in prior art fixed screen or dewatering apparatus, or a relatively shallow opening of the headbox slice type is unnecessary and a conversion of the flow cross-sectional configuration to the desired wide, shallow dimensions is attained with minimal danger of blockage.

FIGS. 3 and 4 disclose an alternate embodiment of the invention wherein a length of flexible tubing or hosing 26 is attached to the end of conduit 24. As seen in FIGS. 3 and 4 tubing 26 may be deformed against plate 16 to provide a somewhat flattened configuration and thereby enhance flow spreading.

While the terminal portion 26 is, therefore, somewhat constricted with respect to portion 24 of the conduit, large objects may still pass through the system readily due to the flexible nature of portion 26 which deforms to allow large objects to pass through.

While the method and forms of apparatus herein described constitute preferred embodiments of the invention, it is to be understood that the invention is not limited to this precise method and forms of apparatus, and that changes may be made therein without departing from the scope of the invention.

What is claimed is:

1. In combination with apparatus having a curved, relatively wide, material treating surface including an upstream end and a downstream end, an improved flow spreader for converting a relatively narrow flow of material to a relatively wide flow of material, said flow spreader comprising: a generally imperforate plate having a lower edge extending substantially co-extensively with said upstream end of said material treating surface, said plate having a relatively sharply curved surface with respect to the curved surface of said material treating surface, and a conduit having a relatively narrow width with respect to the width of said material treating surface and having an outlet thereof directed non-tangentially with respect to said curved surface of said plate and towards an upper portion thereof, whereby material impinging on said curved plate surface from said conduit undergoes a smooth but rapid change of direction, resulting in an inertially induced redimensioning of the cross-sectional configuration of said flow from a stream of relatively deep depth and narrow width approximating the configuration of said relatively narrow conduit outlet to a stream of relatively shallow depth and wide width approximately the width of said relatively wide material treating surface.

2. The combination of claim 1 wherein: said surface of said plate at said lower edge thereof is raised with respect to said material treating surface at said upstream end thereof.

3. The combination of claim 1 wherein: at least a terminal portion of said conduit is flexible.

4. The combination of claim 3 wherein: said terminal portion of said conduit has said outlet thereof deformed against said curved plate surface.

5. The combination of claim 1 wherein: said conduit consists of a single conduit.

6. The combination of claim 1 wherein: said material treating surface is a fixed surface of generally parabolic configuration, and said surface of said plate has a substantially constant radius of curvature.

7. In combination with a generally vertically oriented, parabolically shaped dewatering surface of relatively wide width consisting of a plurality of generally horizontally extending spaced bars, means for directing a flow of material to be screened across said dewatering surface comprising: an imperforate plate having a lower edge thereof adjoining an upstream end of said dewatering surface, said imperforate plate having a curved surface of substantially constant radius of curvature and a substantially greater degree of concavity than that of said generally parabolic dewatering surface, a single conduit substantially centrally disposed with respect to the width of said curved plate and having a flexible outlet end thereof deformed from a generally circular cross section through engagement of said outlet against said curved plate surface, the width of said conduit being substantially less than the width of said dewatering surface and the axis of flow from said conduit intersecting said curved plate surface non-tangentially, whereby material to be dewatered, upon exiting said conduit and impinging on said curved plate surface, is directed about a smooth but relatively sharp curve resulting in said flow from said conduit being transformed to a relatively shallow depth, wide width stream adjacent said upstream end of said dewatering surface.

8. A method of feeding material to a generally parabolically curved material treating surface comprising the steps of:
 discharging a flow of material from a supply conduit,
 as said material exits said conduit changing the direction of flow of said material,
 continuously changing said direction of flow of said material as said material flows from said conduit to an upstream edge of said parabolically shaped material treating surface,
 said steps of continuously changing said direction of flow including directing said flow along a curved path of substantially constant radius immediately upstream of an upstream edge of said parabolically curved material treating surface, and
 said discharging step includes discharging said flow of material from said conduit in a non-tangential direction with respect to said curved path;
 thereby inducing said stream to be transformed by inertial forces from a stream of relatively narrow width and appreciable depth to a stream of relatively shallow depth and wide width.

9. The method of claim 8 further comprising: feeding said material to said material treating surface at a position spaced outwardly thereof at said upstream edge of said surface.

10. The method of claim 8 further comprising: changing the cross-sectional configuration of said flow of material just prior to discharging said material from said conduit.

* * * * *